Patented Aug. 26, 1924.

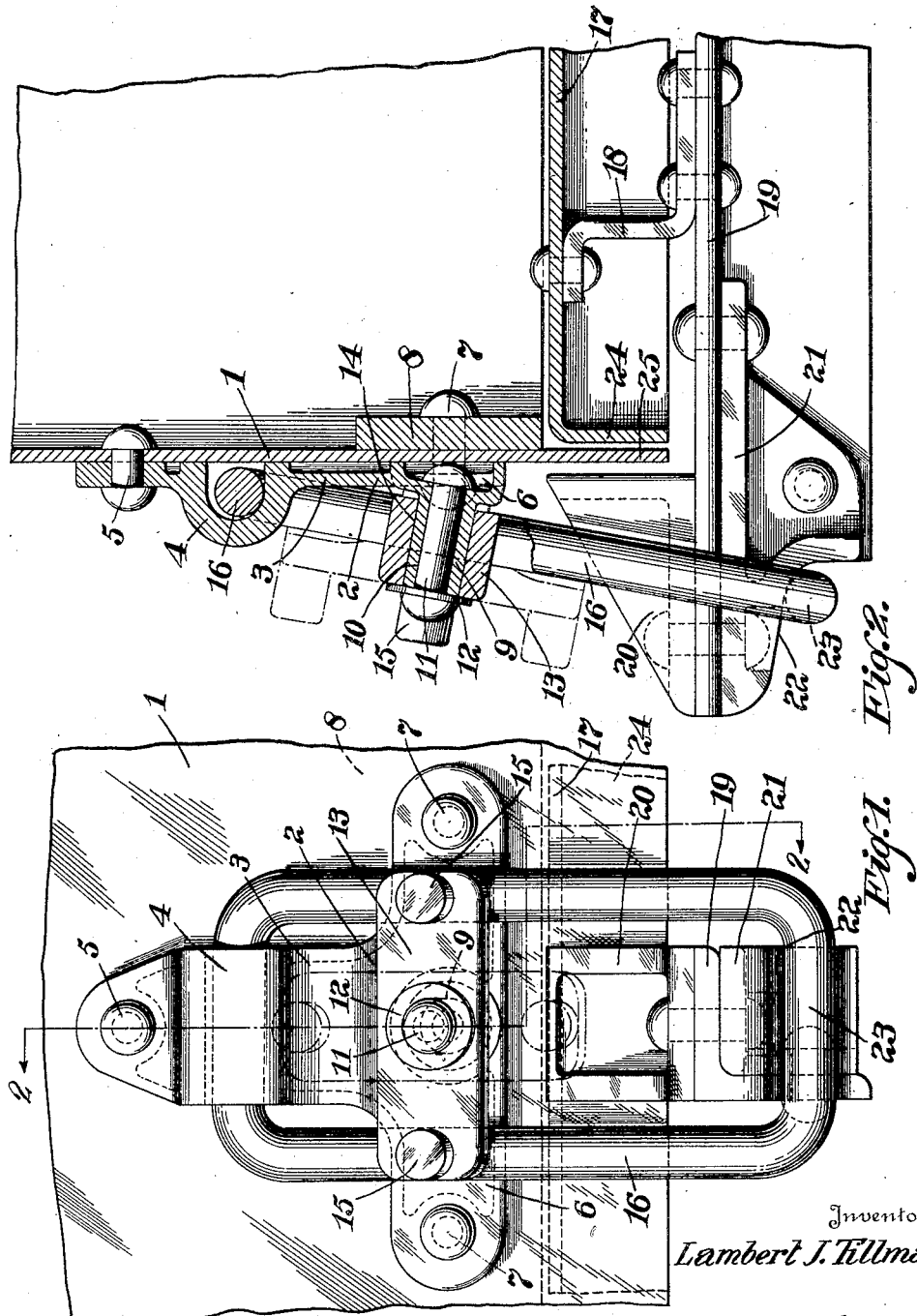

1,506,692

UNITED STATES PATENT OFFICE.

LAMBERT J. TILLMAN, OF TOLEDO, OHIO.

CAR-DOOR-LOCKING DEVICE.

Application filed February 27, 1922. Serial No. 539,555.

*To all whom it may concern:*

Be it known that I, LAMBERT J. TILLMAN, a citizen of the United States of America, residing at Toledo, in the county of Lucas and State of Ohio, have invented certain new and useful Improvements in Car-Door-Locking Devices, of which the following is a specification.

My invention relates to new and useful improvements in car door locking devices and has for an object to provide a device which is exceedingly simple in construction, efficient in operation and relatively cheap to manufacture.

Another object of the present invention is to provide a locking device for freight car drop doors of any form, wherein an angle iron will be secured to the bottom of the door and on the outer end of the angle iron will be a bracket which in turn will be supported by a link which is pivotally mounted on the side of the car; the pivotal support comprising a bracket on which there is pivoted, also, a short locking bar which, when turned in one direction will permit the link to be swung outwardly to release the door, and which, when swung into the opposite direction will tightly hold the link in engagement with the bracket positioned on the angle iron, thus tightly holding and locking the door in its closed position.

With these and other objects in view the invention consists in certain new and novel features and combination of parts as will be hereinafter more fully described and pointed out in the claims.

Referring now to the several figures showing a preferred embodiment of the invention, Fig. 1 is a view in elevation showing a fragmentary portion of a side of a car and the locking device, the latter being shown supporting a door in its closed position and Fig. 2 is a sectional view taken on line 2—2 of Fig. 1 looking in the direction of the arrows.

At the outset it might be mentioned that I have shown a fragmentary portion of a car and a door and only for the purpose of illustration, as the locking device may be advantageously used on drop doors of any form.

Referring now more specifically to the drawings, a fragmentary portion 1 of a side of a car is shown to which is riveted a substantially inverted T-shaped plate 2, the leg 3 having formed therein a bearing 4 while the upper end of the leg is riveted as at 5 to the side of the car body, while the bottom bar 6 is riveted as at 7 and preferably through a reinforcing plate 8 which is placed on the inner side of the car body. About midway of the bottom bar 6 of the plate 2 is formed the outstanding stud 9 which is drilled as at 10 for the reception of a rivet or bolt 11, which, together with a washer 12 are designed to hold a locking bar or arm 13 rotatable on the stud, this bar 13 being provided with a central opening 14 which is only slightly larger than the diameter of the stud so that although the bar may be rotated, it will not swing freely or rotate unless manually manipulated. Near the outer end of this bar 13, and on its outer surface, are the oppositely positioned lugs 15 which may be used by the operator as handles when it is desired to revolve or turn this bar to lock or unlock the device.

Swingingly mounted in the bearing 4 of the upper leg 3 of the plate 2 is the link 16 which is placed in position behind the plate 2 when the latter is attached to the side of the car, the width of the link and the length of the locking bar 13 being such that when the locking bar is in position as shown in Fig. 1 it will just straddle the side arms of the link and of course prevent the same from swinging outwardly from the car body, while, on the other hand, when turned to a vertical or upright position the link will be free to swing to permit the lowering of the door.

In the embodiment shown in the drawings, there is a fragmentary portion 17 of a door bottom to which is riveted the Z-bar 18 which in turn is riveted to an angle iron 19 designed to extend completely across the door and outwardly beyond the free sides of the car. Upon the outer end of this angle iron 19 there is riveted a small bracket 20, while beneath the same is riveted the small bracket 21 which is curved or cut-out at its outer end 22 so that the bottom bar 23 of the link 16 will pass within this cut-out portion 22 when the door is in its supported position.

The door in the present embodiment also has the downturned flange 24 which will lie adjacent the lower strip 25 of the side of the car body, while the upper bracket 20 will also lie adjacent the strip 25 but, of course, on the outer side, the bracket and the door flange both providing a means for guiding the door during its final closing movement.

These two brackets may be riveted to each other and the lower bracket may be riveted to both legs of the angle 19, as clearly shown in Fig. 2. It will also be understood that any other desired form of bracket or brackets might be used which will provide a ledge or engaging surface for the link.

Although I have only shown a portion of one side of a car and a portion only of one end of a door and its angle iron, it is to be understood that in most instances a similar arrangement will be used on the opposite side of the car and door so that the door will be supported from both of its corners.

From the foregoing it will be seen that the locking or unlocking of the door is a relatively simple matter, the locking bar holding the link tightly in engagement with the angle on the door when the bar is in one position, and permitting the link to be swung outwardly when the locking bar is in its vertical or upright position.

I have shown the face plate 2 as cored and parts thereof spaced from the side of the car body for the reception of the rivet head, etc., and further coring or ribs may be provided if found necessary.

Many slight changes might be made without in any way departing from the spirit and scope of the invention. Having thus described the same, what I claim as new and desire to secure by Letters Patent is:

1. A locking device for drop doors comprising a plate, a link swingingly mounted in said plate, a locking bar rotatably mounted on said plate and when in a horizontal position straddling the side arms of said link to thereby prevent the swinging of said link, a bracket adapted to be secured to a door and said link fitting under said bracket for supporting said door in its closed position.

2. A car door locking device comprising a plate, a bearing formed in said plate and a link swingingly mounted in said bearing, a stud formed on said plate and centrally within the arms of the link, a rotatable bar mounted on said stud for holding the link in a locked position, and a bracket adapted to be secured to a door and having its outer end curved for the reception of said link.

3. In combination with a freight car having a drop bottom door, a locking device comprising a plate secured to the side of the car body, said plate provided with a bearing, a link swingingly mounted in said bearing, a stud formed on said plate and an arm rotatably mounted on said stud, a beam secured to the car door having a bracket formed on its outer end and directly beneath the said link, said bracket being cut out on its upper portion to provide a bearing surface for said link, the arm on said plate permitting a swinging of the link when the said bar is in an upright position and locking the link in engagement with the bracket associated with the door when said link is in a horizontal position to thereby support and lock the door in its closed position.

4. In combination with a freight car having a drop bottom door, a plate secured to the side of the car body, and substantially of inverted T-shape, a bearing formed in the upright leg of the plate and a link swingingly mounted in said bearing, a stud formed on the said plate, a rotatable locking bar mounted on said stud, an angle iron secured to the door and provided with an upper and lower bracket on its end, the lower bracket having a cut out portion forming a ledge to be engaged by the said link, and said rotatable bar straddling the arms of said link when said locking bar is in a horizontal position to thereby hold the door in a supported and locked position.

5. In combination with a freight car having a drop bottom door, a plate secured to the side of the car body, a swinging link mounted therein, a bearing post formed on said plate and a rotatable locking bar mounted on said post, an angle iron secured to the bottom of the door, and spaced from said door, the said angle iron extending beyond the free side of the car body and directly beneath the said link, receptive means positioned on the outer ends of said angle irons to be engaged by the said link, said locking bar holding the link in engagement with said receptive means when in one position and permitting the link to swing when in another position.

6. In combination with a freight car having a drop bottom door, said door having a downwardly depending flange along its front edge, a plate secured to the side of the car body, said plate having an opening therein to form a bearing, a swinging link mounted in said bearing, a member secured to the door and extending outwardly beyond the free side of the car body and below the flange on the forward edge of the door, an undercut bracket secured to the outer end of the said member to form an engaging surface for the said link, a top bracket secured upon the end of said member to form, together with said flange, a guide to partly encase a portion of the car body, and means for holding the link in engagement with said undercut bracket to thereby secure the door in its locked position.

In testimony whereof I affix my signature.

LAMBERT J. TILLMAN.